(12) United States Patent
Meyer-Rusitschka et al.

(10) Patent No.: US 8,336,825 B2
(45) Date of Patent: Dec. 25, 2012

(54) PASSENGER STAIRWAY FOR AN AIRCRAFT AND METHOD FOR PULLING IN AND OUT THE PASSENGER STAIRWAY

(75) Inventors: Kathrin Meyer-Rusitschka, Marschacht (DE); Michael Meyer, Buxtehude (DE)

(73) Assignee: Airbus Operations GmbH, Hamburg (DE)

( * ) Notice: Subject to any disclaimer, the term of this patent is extended or adjusted under 35 U.S.C. 154(b) by 1040 days.

(21) Appl. No.: 11/862,278

(22) Filed: Sep. 27, 2007

(65) Prior Publication Data

US 2008/0073464 A1    Mar. 27, 2008

Related U.S. Application Data

(60) Provisional application No. 60/827,087, filed on Sep. 27, 2006.

(30) Foreign Application Priority Data

Sep. 27, 2006   (DE) .......................... 10 2006 045 596

(51) Int. Cl.
*B64C 1/24* (2006.01)
*E06C 9/06* (2006.01)
*E04F 11/06* (2006.01)

(52) U.S. Cl. .................... 244/137.2; 244/129.6; 182/97; 182/106

(58) Field of Classification Search .............. 244/129.6, 244/137.1, 137.2; 182/1, 106, 97
See application file for complete search history.

(56) References Cited

U.S. PATENT DOCUMENTS

| | | | | |
|---|---|---|---|---|
| 1,867,904 A * | 7/1932 | Bessler | | 182/78 |
| 2,812,528 A * | 11/1957 | Odell | | 52/183 |
| 2,933,149 A * | 4/1960 | Royal | | 182/78 |
| 2,990,148 A * | 6/1961 | Varnell | | 244/129.6 |
| 3,047,093 A * | 7/1962 | Cruz | | 182/97 |
| 3,871,479 A * | 3/1975 | Pelto | | 182/86 |
| 3,941,337 A | 3/1976 | Molter | | 244/129 |
| 4,014,486 A * | 3/1977 | Nelson et al. | | 244/129.6 |
| 4,021,071 A * | 5/1977 | Norman | | 296/62 |
| 4,669,574 A | 6/1987 | Moutot | | 182/88 |
| 5,143,324 A | 9/1992 | Cornelius | | 244/129.6 |
| 6,986,485 B2 * | 1/2006 | Farnsworth | | 244/118.5 |
| 6,994,184 B2 * | 2/2006 | Latimer et al. | | 182/77 |
| 7,225,896 B2 * | 6/2007 | Broad | | 182/106 |

FOREIGN PATENT DOCUMENTS

| | | |
|---|---|---|
| DE | 2 164 540 | 12/1971 |
| DE | 2 313 319 | 3/1973 |
| DE | 40 26 192 | 2/1992 |
| EP | 0197873 | 2/1986 |
| FR | 2341716 A * | 10/1977 |
| FR | 2 577 883 | 8/1986 |

* cited by examiner

*Primary Examiner* — Joseph W Sanderson
(74) *Attorney, Agent, or Firm* — Ingrassia Fisher & Lorenz, P.C.

(57) ABSTRACT

A passenger stairway, which may be integrated with an aircraft, contains at least one first stairway segment having a first plurality of steps and a receptacle device, and at least one second stairway segment having a second plurality of steps, which is insertable into the receptacle device, so that the first and second stairway segments come to rest lying one on top of another.

8 Claims, 3 Drawing Sheets

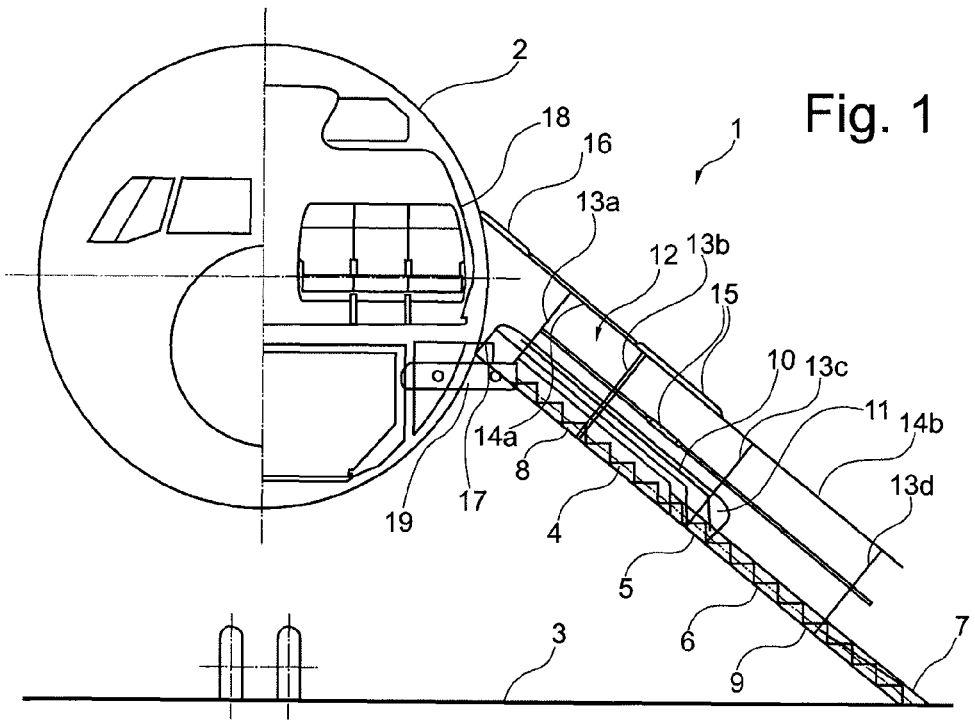
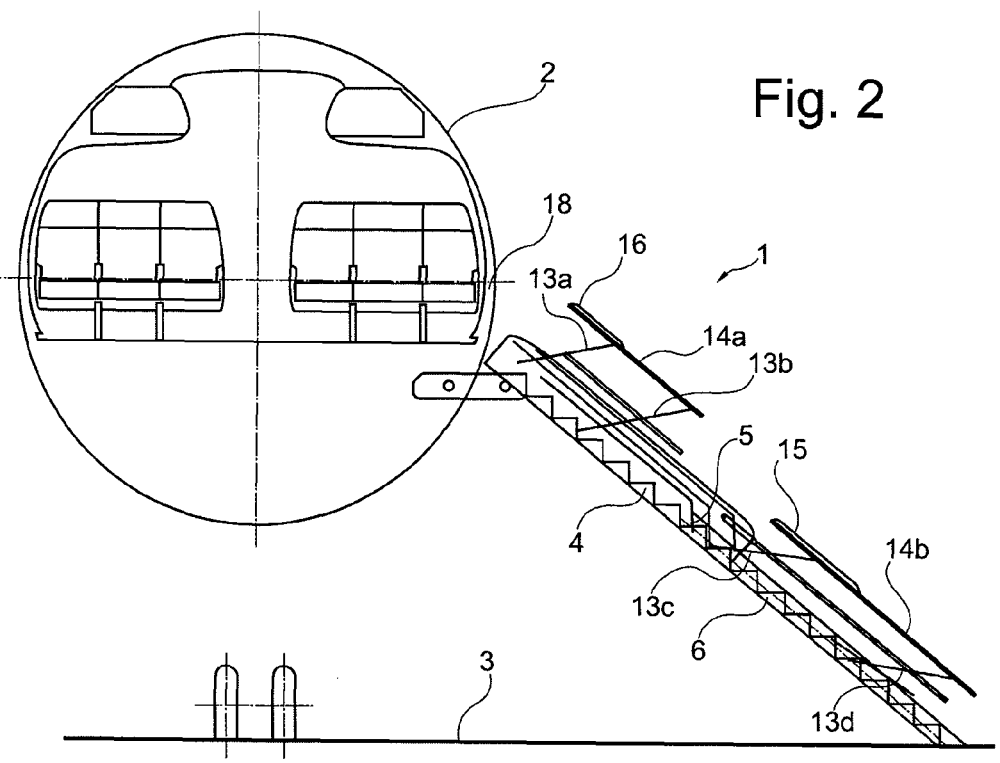

PASSENGER STAIRWAY FOR AN AIRCRAFT AND METHOD FOR PULLING IN AND OUT THE PASSENGER STAIRWAY

This application claims the benefit of the filing date of German Patent Application No. 10 2006 045 596.7 filed Sep. 27, 2006 and of U.S. Provisional Patent Application No. 60/827,087 filed Sep. 27, 2006, the disclosure of which applications is hereby incorporated herein by reference.

TECHNICAL FIELD

The present invention relates to a passenger stairway for an aircraft, in particular an airplane, as well as a method for pulling in and out the passenger stairway to or from the fuselage of the aircraft.

BACKGROUND OF THE INVENTION

Passenger stairways as access to the aircraft interior are known in various embodiments. In addition to one-piece pivotable stairways, which are implemented as a part of an external wall of the aircraft, and one-piece insert stairways, which may be received by recesses in the area of the aircraft fuselage, two-piece folding insert stairways are known, in which two segments are connected to one another so they are pivotable and may be inserted into a receptacle space in the area of the aircraft fuselage in a state pivoted toward one another.

However, a large receptacle space tailored to the volume of the stairway is required for the known insert stairways.

Moreover, the use of known aircraft stairways is problematic in aircraft which have both a small overall size and also passenger doors situated high in relation to a standing surface.

In previously known solutions either a complicated folding mechanism is necessary or a large stowing volume is needed because of the high door thresholds.

High door thresholds additionally result in long and/or tall stairways. In previously known solutions, in this case either a complicated folding mechanism is necessary or a large stowing volume in the aircraft fuselage is needed.

DESCRIPTION OF THE INVENTION

There may be a need to provide a passenger stairway and a method for pulling in and out the passenger stairway, which require a smaller stowing volume inside an aircraft fuselage and simultaneously provide increased stairway comfort.

The achievement of the stated need and advantageous refinements of the present invention are disclosed herein.

The passenger stairway according to the present invention, which may be integrated with an aircraft, contains at least one first stairway segment having a first plurality of steps and a receptacle device, and at least one stairway segment having a second plurality of steps, which is insertable into the receptacle device of the first stairway segment.

According to an embodiment of the present invention, the first stairway segment contains a first plurality of pivotable supports in its longitudinal direction, whose ends facing away from the first stairway segment are connected to a first part of a handrail so they are pivotable. Furthermore, the second stairway segment contains a second plurality of pivotable supports in its longitudinal direction, whose ends facing away from the second stairway segment are connected to a second part of the handrail so they are pivotable. The handrail parts are lockable with one another via corresponding connection elements to form a stairway railing. Because the supports are pivotable and the handrail is disassembled into two parts and may be folded against a corresponding stairway segment, a compact construction having a small stowing volume is obtained.

According to an embodiment of the present invention, in the extended state of the stairway, in which the second stairway segment is not inserted into the receptacle device of the first stairway segment, the handrail parts are locked to one another by the connection elements, and in the retracted state of the stairway, in which the second stairway segment is inserted into the receptacle device of the first stairway segment, the handrail parts are unlocked from one another to fold the supports and the handrail parts against the corresponding first and second stairway segments.

According to an embodiment of the present invention, the passenger stairway also contains a pull slide which retracts the second stairway segment into the first stairway segment via a drive guided by a link when the supports and the handrail parts are folded up.

According to an embodiment of the present invention, the pull slide contains a motor which first pivots the first and second stairway segment into a horizontal position when the supports and the handrail parts are folded up, before the second stairway segment is inserted into the receptacle device of the first stairway segment.

According to the present invention, the passenger stairway may be retractable into the fuselage of an aircraft when the second stairway segment is inserted into the receptacle device of the first stairway segment and the supports and handrail parts are folded up.

The passenger stairway according to the present invention may have a compact construction and may require a small stowing volume inside the aircraft fuselage.

Furthermore, the possibility may be provided by the compact construction (small volume) of housing a longer stairway in the aircraft, which in turn results in increased stairway comfort, especially low step height, greater step depth, and smaller step incline angle.

According to a method for retracting the above-mentioned passenger stairway into the fuselage of an aircraft, the connection elements are unlocked, the handrail parts are folded against the corresponding first and second stairway segments, the passenger stairway is pivoted into a horizontal position, while the handrail parts are folded against the first and second stairway segments, the first and the second stairway segments are unlocked, the second stairway segment is retracted into the receptacle device of the first stairway segment so that the second stairway segment lies essentially above the first stairway segment and the stairway segments lie one on top of another and the folded-up handrail parts are withdrawn into the fuselage.

According to a method for extending the above-mentioned passenger stairway from the fuselage of an aircraft, the stairway segments lying one on top of another and the folded-up handrail parts are extended out of the fuselage of the aircraft in a horizontal position, the second stairway segment is extended out of the receptacle device of the first stairway segment in a horizontal position, the first and the second stairway segments are locked to one another, the stairway is pivoted from the horizontal position into a position in which the stairway contacts a floor, the handrail parts are folded down from the stairway segments and locked using the connection elements.

BRIEF DESCRIPTION OF THE DRAWINGS

A preferred exemplary embodiment of the present invention is described in the following with reference to the attached drawings.

FIG. 1 shows a schematic view of a passenger stairway according to a preferred exemplary embodiment in an extended state;

FIG. 2 shows a schematic view of the passenger stairway from FIG. 1, in which the handrail parts are unlocked.

DETAILED DESCRIPTION OF EXEMPLARY EMBODIMENTS

Figure 3:
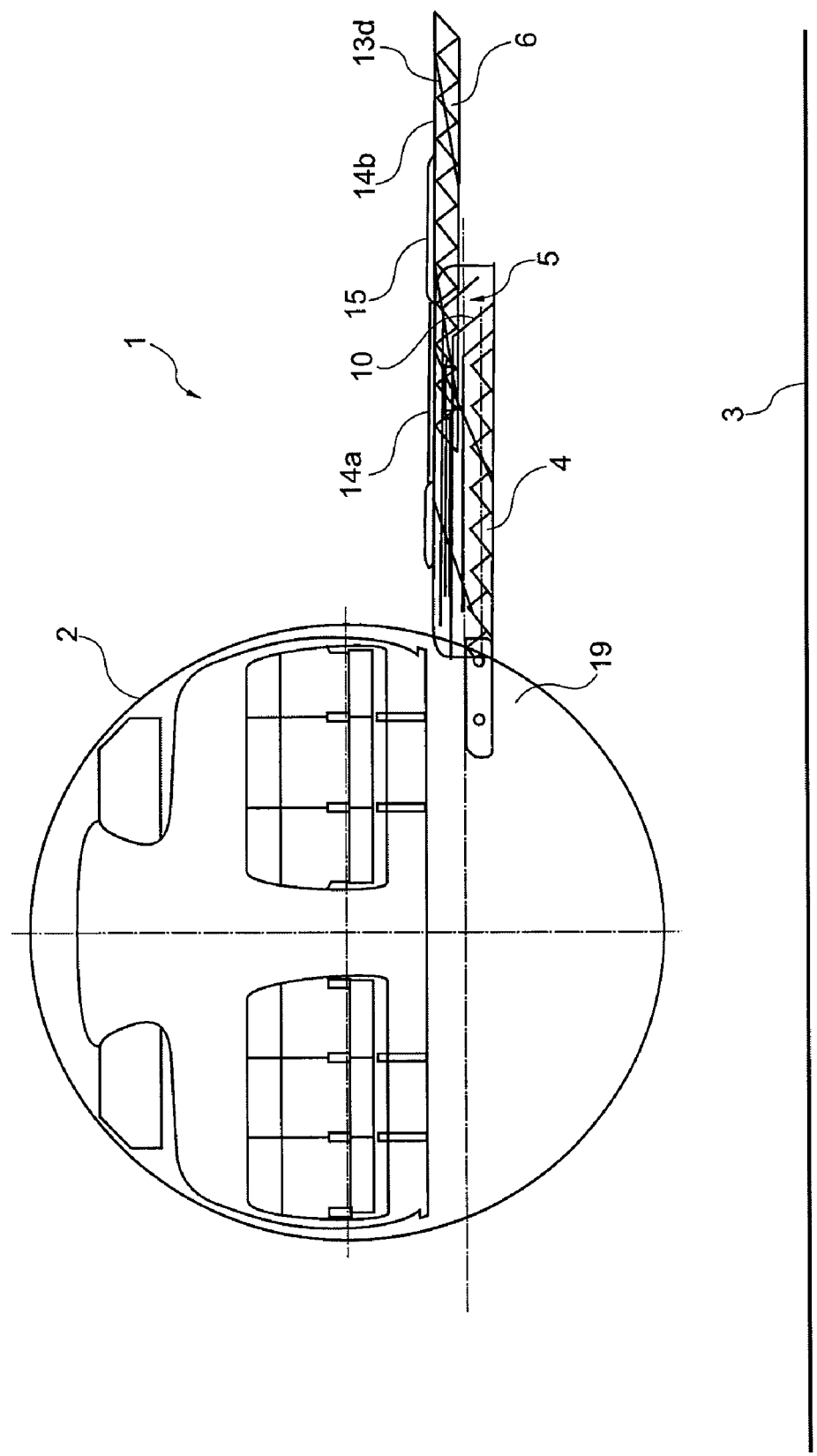
FIG. 3 shows a schematic view of the passenger stairway from FIG. 1, which is brought into a horizontal position.

In the following, identical reference numerals are used to identify identical or corresponding parts.

FIG. 1 shows a schematic view of a passenger stairway 1 according to a preferred exemplary embodiment. As shown in FIG. 1, the passenger stairway 1 is used for connecting an aircraft fuselage 2 to a standing surface 3, on which the aircraft stands.

The passenger stairway 1 contains a first stairway segment 4, which is locked via a locking device 5 to a second stairway segment 6 in the state shown in FIG. 1. The free end 7 of the second stairway segment 6 contacts the standing surface 3.

As shown in FIG. 1, the first stairway segment 4 has a plurality of steps 8 and the second stairway segment 6 has a second plurality of steps 9.

According to the preferred exemplary embodiment, the length of the first stairway segment 4 is equal to the length of the second stairway segment 6. Alternatively, for example, the second stairway segment 6 may be shorter than the first stairway segment 4, or vice versa.

As shown in FIG. 1, the first stairway segment 4 of the passenger stairway 1 contains a receptacle device 10, which is also referred to as a link 10, for receiving the second stairway segment 6, as described later.

The locking device 5 is preferably implemented on the end 11 of the first stairway segment 4 lying distal from the aircraft fuselage 2.

In the state of the passenger stairway 1 shown in FIG. 1, in which entry and exit is possible, a stairway railing 12 is formed. The stairway railing 12 is formed according to the preferred exemplary embodiment by multiple supports 13a through 13d, which are situated at a predefined interval in the longitudinal direction on both sides of the stairway segments 4 and 6. As shown in FIG. 1, the supports 13a through 13d stand essentially perpendicularly to a plane in which the stairway 1 lies, away from the standing surface 3 in the direction of a handrail, which is formed by a first handrail part 14a and a second handrail part 14b.

In the state shown in FIG. 1, the handrail parts 14a and 14b are locked to one another via connection elements 15.

As described later, the supports 13a through 13d are each implemented as pivotable on the first stairway segment 4 or the second stairway segment 6 and on the handrail parts 14a or 14b, respectively, to be folded against the corresponding stairway segments together with the handrail parts 14a and 14b.

According to the preferred exemplary embodiment, the passenger stairway 1 contains a further connection element 16, which forms an end connection between the aircraft fuselage 2 and the handrail part 14a. The connection element 16 is used for the purpose of locking or unlocking the handrail part 14a to or from the aircraft fuselage 2.

Furthermore, according to the preferred exemplary embodiment, as shown in FIG. 1, an additional step 17 is provided, which is folded out of a door area 18 of the aircraft fuselage 2, to ensure safe entry and exit. The additional step 17 may be folded into the cabin door area (not shown).

As shown in FIG. 1, a pull slide 19 is also provided to extend or retract the passenger stairway 1 from or into the aircraft fuselage 2, as described later.

FIG. 2 shows the passenger stairway 1 in a state in which the connection elements 15 and 16 of the handrail parts 14a and 14b are unlocked, because of which it is possible to pivot the supports 13a through 13d in relation to the plane in which the stairway 1 lies and fold them against the stairway segments 4, 6.

The supports 13a, 13b may especially be folded together with the handrail part 14a against the first stairway segment 4 and the supports 13c and 13d may be folded together with the handrail part 14b against the second stairway segment 6. In the state shown in FIG. 2, the stairway segments 4 and 6 are still locked to one another by the locking device 5.

FIG. 3 shows the passenger stairway 1 in a state in which it is brought into an essentially horizontal position, the second stairway segment 6 no longer contacting the standing surface 3. Furthermore, as shown in FIG. 3, the supports 13a through 13d and the handrail parts 14a and 14b as well as the connection elements 15, 16 are completely folded against the corresponding stairway segments 4, 6.

As shown in FIG. 3, the pull slide 19 is used on one hand to bring the first stairway segment 4 together with the second stairway segment 6 into the horizontal position. After the locking device 5 is unlocked, the stairway segments 4, 6 may be displaced in relation to one another.

Figure 4:
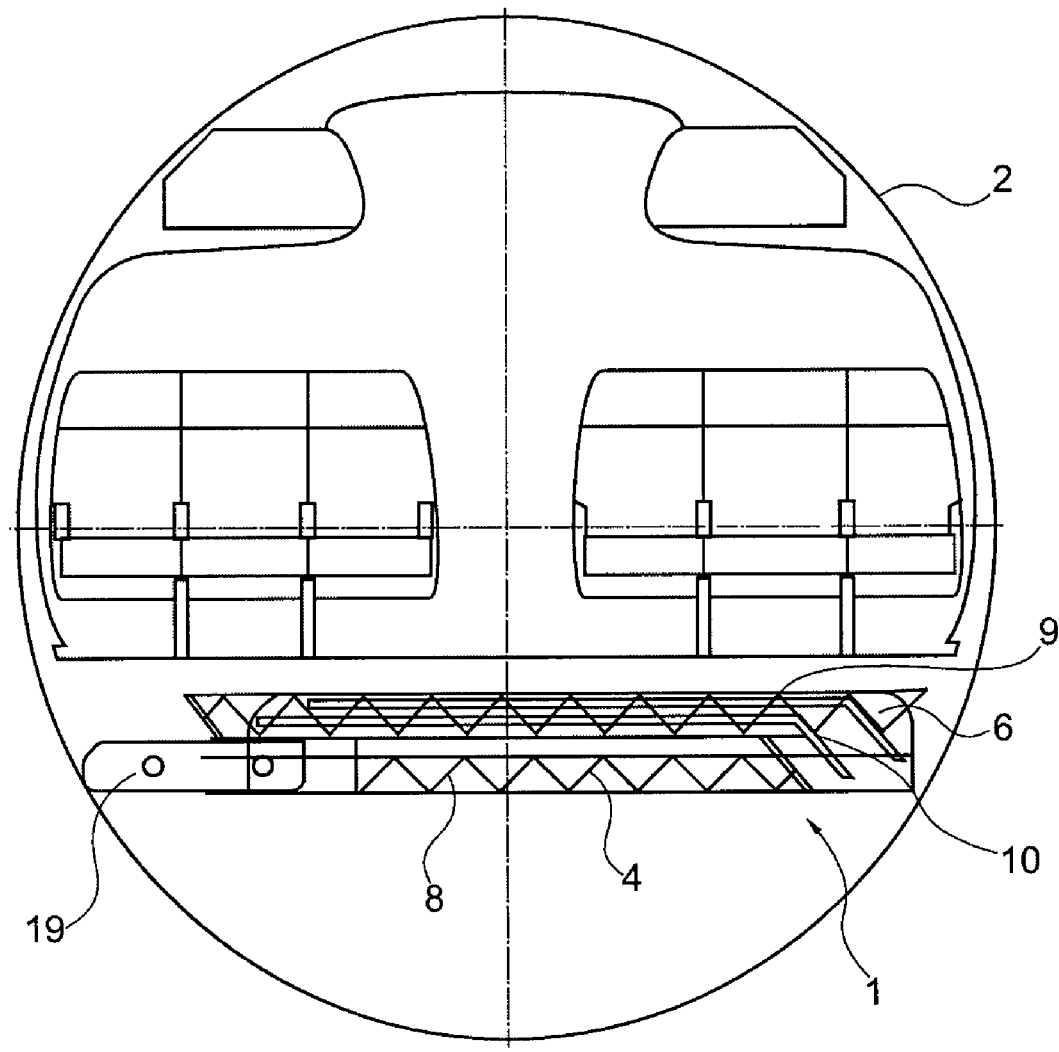
FIG. 4 shows a schematic view of the passenger stairway from FIG. 1, which is retracted into the fuselage of an aircraft.

The second stairway segment 6 is especially inserted and/or retracted into the receptacle device 10 of the first stairway segment 4, so that the first stairway segment 4 and the second stairway segment 6, are brought to rest lying one on top of another, as shown in FIG. 4.

With the aid of the pull slide 19, the second stairway segment 6 is thus retracted into the receptacle device 10 of the first stairway segment 4. Two pins, which run in guide rails, may be activated via cable pulls inside the receptacle device 10 for this purpose, for example. Secure guiding of the second stairway segment 6 may thus be ensured. The drive may also be produced via alternatives, such as gearwheels or hydraulic cylinders.

FIG. 4 shows a state in which the passenger stairway 1 is inserted completely into the aircraft fuselage 2. According to the preferred exemplary embodiment, the second stairway segment 6 is essentially of equal length to the first stairway segment 4. As shown in FIG. 4, the distance between the individual steps of the plurality of the first steps 8 of the first stairway segment 4 and between the individual steps of the plurality of the steps 9 of the second stairway segment 6 is constant. The steps of the plurality of first steps 8 are not displaced toward one another upon retraction of the passenger stairway 1 into the aircraft fuselage 2. The steps of the plurality of the steps 9 are also not displaced toward one another.

Upon extension of the passenger stairway 1, the actions described above with reference to FIGS. 1 through 4 are performed in reverse sequence and will not be described again.

Although the present invention was described above with reference to a preferred exemplary embodiment, it is obvious that modifications and alterations may be performed without leaving the scope of protection of the present invention. For example, more than two stairway segments may also be used, which may be inserted one inside another in relation to one another and come to rest essentially lying one on top of another, before they are retracted into the aircraft fuselage.

In addition, it is to be noted that "comprising" does not exclude other elements or steps and "a" or "one" does not exclude a plurality. Furthermore, it is to be noted that features or steps which have been described with reference to one of the above exemplary embodiments may also be used in combination with other features or steps of other exemplary embodiments described above. Reference numerals in the claims are not to be seen as a restriction.

The invention claimed is:

1. A passenger stairway, which is configured to be integrated with an aircraft, containing
    at least one first stairway segment having a first plurality of steps and a receptacle device, and
    at least one second stairway segment having a second plurality of steps, which is configured to be inserted into the receptacle device of the first stairway segment, so that the first and second stairway segments come to rest with the second stairway segment lying on top of the first stairway segment;
    wherein the steps of the first plurality of steps and the steps of the second plurality of steps are fixedly attached to the first and second stairway segments, respectively:
    wherein, upon retraction of the passenger stairway into the aircraft fuselage, the steps of the first plurality of steps remain unchanged in their position relative to the first stairway segment; and
    wherein, upon retraction of the passenger stairway into the aircraft fuselage, the steps of the second plurality of steps remain unchanged in their position relative to the second stairway segment.

2. The passenger stairway of claim 1, wherein the first stairway segment has a first plurality of supports in its longitudinal direction, the first plurality of supports being configured to be pivoted, whose ends facing away from the first stairway segment are connected to a first part of a handrail so that the first part of the handrail is configured to be pivoted along with the first plurality of supports,
    the second stairway segment has a second plurality of supports in its longitudinal direction, the second plurality of supports being configured to be pivoted, whose ends facing away from the second stairway segment are connected to a second part of the handrail so that the second part of the handrail is configured to be pivoted along with the second plurality of supports, and
    the handrail parts are configured to be locked with one another via corresponding connection elements to form a stairway railing.

3. The passenger stairway of claim 2, wherein, in an extended state of the stairway, in which the second stairway segment is not inserted into the receptacle device of the first stairway segment, the handrail parts are locked to one another by the connection elements, and in a retracted state of the stairway, in which the second stairway segment is inserted into the receptacle device of the first stairway segment, the handrail parts are unlocked from one another to fold the supports and the handrail parts against the corresponding first and second stairway segments.

4. The passenger stairway of claim 3, also having a pull slide, which
    retracts the second stairway segment, via a drive guided by a link, into the first stairway segment
    when the supports and the handrail parts are folded up.

5. The passenger stairway of claim 4, wherein the pull slide contains a motor, which pivots the first and second stairway segments into a horizontal position, when the supports and the handrail parts are folded up, before the second stairway segment is retracted into the receptacle device of the first stairway segment.

6. The passenger stairway of claim 5, wherein the stairway is configured to be retracted into the fuselage of the aircraft when the second stairway segment is retracted into the receptacle device of the first stairway segment and the supports and the handrail parts are folded up.

7. A method for inserting a passenger stairway of claim 2 into the fuselage of an aircraft, comprising:
    unlocking the connection elements;
    folding the handrail parts against the corresponding first and second stairway segments;
    pivoting the passenger stairway into a horizontal position;
    unlocking the first and second stairway segments;
    inserting the second stairway segment into the receptacle device of the first stairway segment; and
    retracting the stairway segments lying one on top of another and the folded-up handrail parts into the fuselage.

8. A method for extending a passenger stairway of claim 2 from the fuselage of an aircraft, comprising:
    extending the stairway segments lying one on top of another and the folded-up handrail parts and the supports out of the fuselage in a horizontal position;
    extending the second stairway segment out of the receptacle device of the first stairway segment in a horizontal position;
    locking the first and the second stairway segments to one another;
    pivoting the stairway from the horizontal position into a position in which the stairway contacts a floor;
    folding down the handrail parts and the supports from the stairway segments; and
    locking the handrail parts using the connection elements.

* * * * *